(12) United States Patent
Yasuda

(10) Patent No.: US 6,495,849 B2
(45) Date of Patent: Dec. 17, 2002

(54) RADIATION IMAGE READ-OUT APPARATUS

(75) Inventor: Hiroaki Yasuda, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/765,412

(22) Filed: Jan. 22, 2001

(65) Prior Publication Data

US 2001/0011714 A1 Aug. 9, 2001

(30) Foreign Application Priority Data

Jan. 21, 2000 (JP) ........................................ 2000-012353

(51) Int. Cl.[7] .............................................. G03B 42/08
(52) U.S. Cl. ........................ 250/584; 250/581; 250/589
(58) Field of Search ................................. 250/581, 582, 250/583, 584, 585, 586, 589, 484.4, 208, 227

(56) References Cited

U.S. PATENT DOCUMENTS

| | | | | |
|---|---|---|---|---|
| 4,628,211 A | * | 12/1986 | Ruppert | 250/578 |
| 4,631,407 A | * | 12/1986 | Kawajiri et al. | 250/327.2 |
| 4,816,679 A | * | 3/1989 | Sunagawa et al. | 250/327.2 |
| 5,821,552 A | * | 10/1998 | Ishikawa et al. | 250/585 |
| 5,880,476 A | * | 3/1999 | Suzuki | 250/484.4 |
| 5,952,645 A | * | 9/1999 | Wang et al. | 250/208.1 |
| 5,953,133 A | * | 9/1999 | Fujimiya et al. | 358/474 |

* cited by examiner

*Primary Examiner*—Constantine Hannaher
*Assistant Examiner*—Tim Moran
(74) *Attorney, Agent, or Firm*—Sughrue Mion, PLLC

(57) ABSTRACT

In a radiation image read-out apparatus, a stimulable phosphor sheet storing thereon a radiation image is exposed to stimulating light and stimulated emission emitted from the stimulable phosphor sheet upon stimulation by the stimulating light is detected and an image signal representing the radiation image stored on the stimulable phosphor sheet is obtained by photoelectrically converting the stimulated emission. A read-out system includes an array of a plurality of read-out heads, each including a stimulating light source which projects the stimulating light onto the stimulable phosphor sheet and a photodetector which detects the stimulated emission. A conveyor system conveys the stimulable phosphor sheet and the read-out system relative to each other in a direction intersecting the direction of the array of the read-out heads.

20 Claims, 8 Drawing Sheets

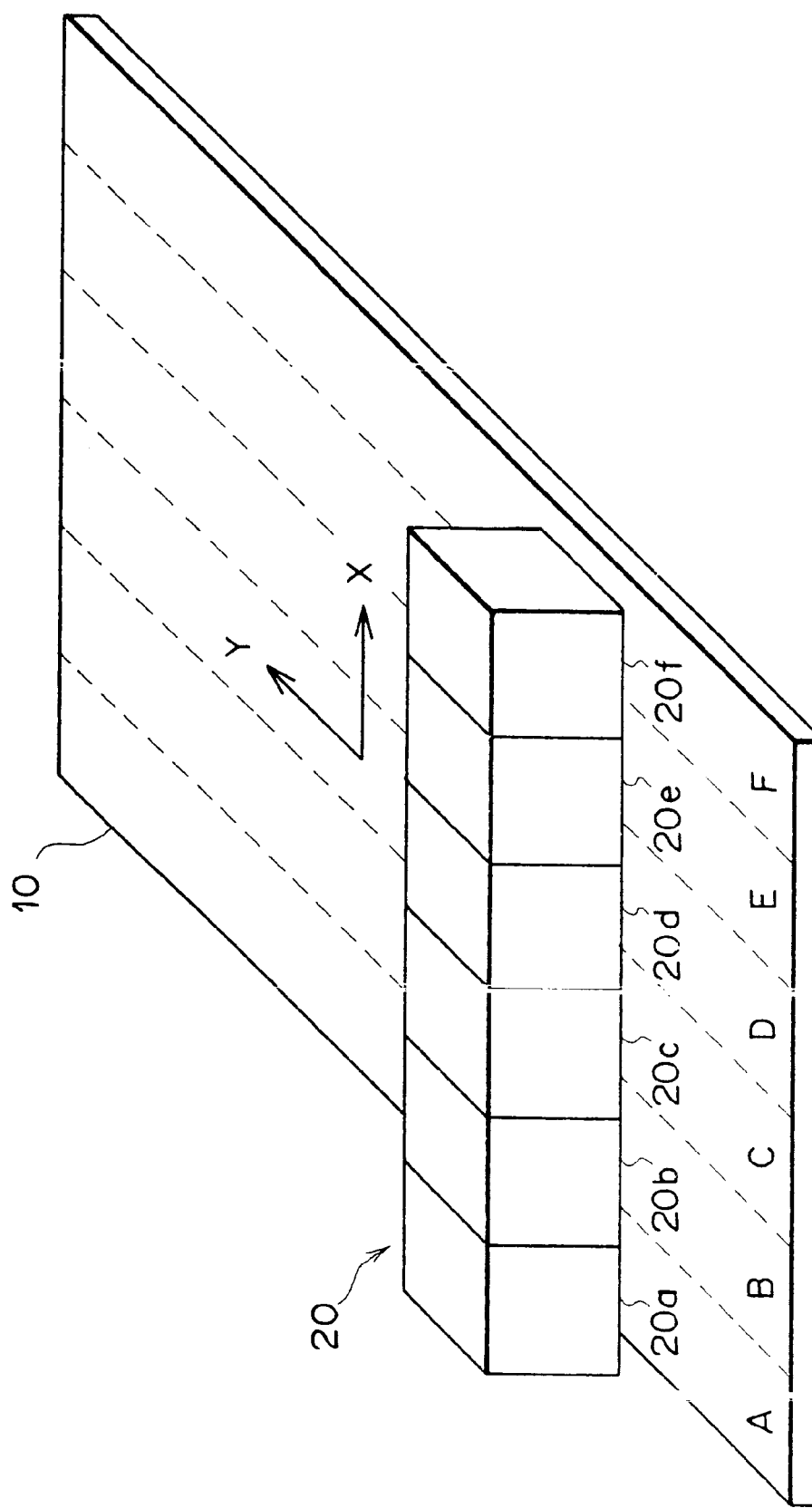
F I G. 1

F I G. 3A
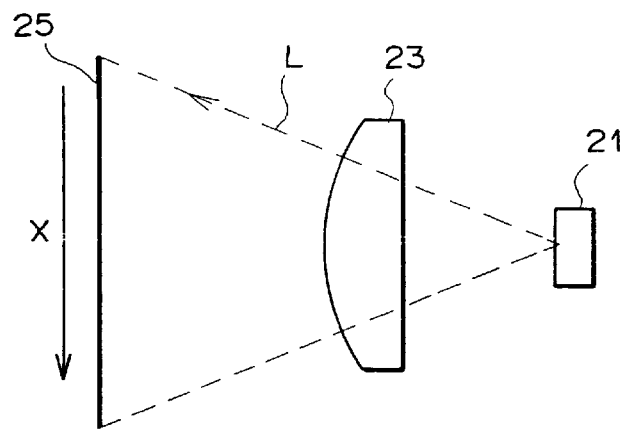
F I G. 3B
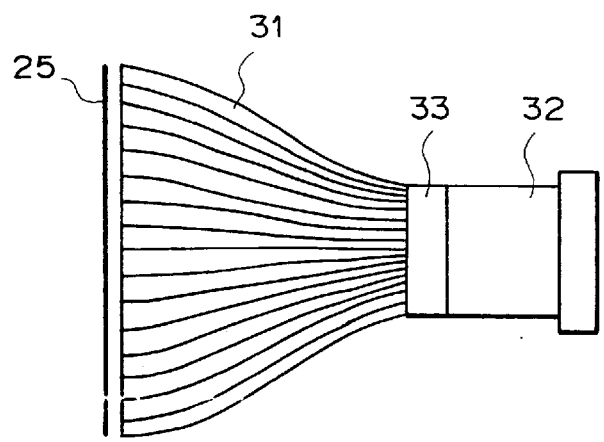

F I G . 6
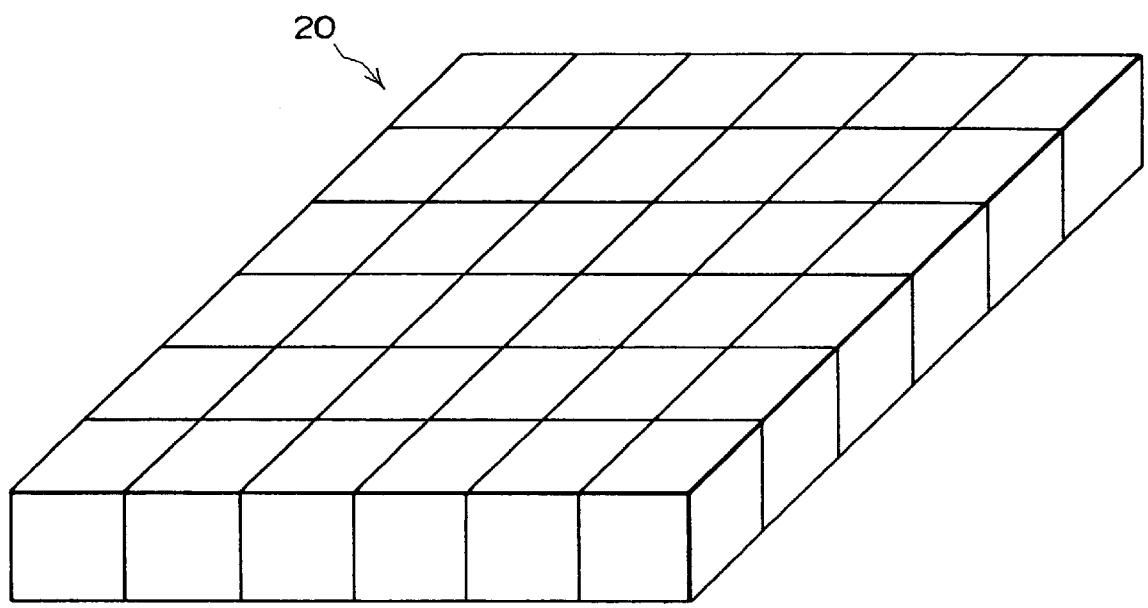

RADIATION IMAGE READ-OUT APPARATUS

BACKGROUND OF THE INVENTION

1. Field of the Invention

This invention relates to a radiation image read-out apparatus which reads out a radiation image stored on a stimulable phosphor sheet.

2. Description of the Related Art

When certain kinds of phosphors are exposed to a radiation such as X-rays, $\alpha$-rays, $\beta$-rays, $\gamma$-rays, cathode rays or ultraviolet rays, they store a part of energy of the radiation. Then when the phosphor which has been exposed to the radiation is exposed to stimulating rays such as visible light or a laser beam, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image read-out apparatus in which a stimulating light beam such as a laser beam is caused to scan a stimulable phosphor sheet (a sheet provided with a layer of the stimulable phosphor) which has been exposed to a radiation passing through an object such as a human body to have a radiation image of the object stored on the stimulable phosphor sheet so that the stimulable phosphor sheet emits stimulated emission, the stimulated emission is detected by the use of a light collecting mirror or an optical guide, the detected stimulated emission is photoelectrically converted by a photomultiplier into an image signal (a radiation image signal), and then the stimulable phosphor sheet is exposed to erasing light after the image signal is obtained from the stimulable phosphor sheet so that the residual energy of the radiation is fully released from the stimulable phosphor sheet.

The radiation image signal thus obtained is subjected to image processing such as gradation processing and/or frequency processing and a radiation image of the object is reproduced as a visible image on the basis of the processed radiation image signal on a recording medium such as a photographic film or a display such as a CRT.

In conventional radiation image read-out apparatuses, there has been a problem that a scanning optical system which can cause a stimulating light beam to scan the stimulable phosphor sheet at least over a half width of the stimulable phosphor sheet and a light condensing/detecting system which can detect stimulated emission diverging at least over a half width of the stimulable phosphor sheet are required, which makes it difficult to miniaturize the apparatus.

In order to overcome the problem, there have been proposed systems in which a line source such as an LED array or an EL element is used as the stimulating light source and a semiconductor sensor is used as an element for detecting the stimulated emission. However such systems have not been put into practice because of poor intensity of the stimulating light source and/or a poor SN ratio of the semiconductor sensor including the processing circuit.

Further, in order to improve the durability of the stimulable phosphor sheets and to improve the quality of the image, there has been proposed a rigid stimulable phosphor sheet. The conventional radiation image recording and reproducing apparatuses are generally provided with a sub-scanning system which conveys the stimulable phosphor sheet in a direction substantially normal to the direction in which the stimulating light beam scans the stimulable phosphor sheet. Use of the rigid stimulable phosphor sheet requires the sub-scanning system to be at least twice as long as the length of the stimulable phosphor sheet, which is disadvantageous in that the overall size of the apparatus becomes very large. Further, when the sub-scanning system is arranged to convey the read-out system including the scanning optical system and the light condensing/detecting system in the sub-scanning direction, the sub-scanning system should be very firm since the read-out system is very large and a very large space is required to move the large read-out system, which adds to the cost and increases the overall size of the apparatus.

Further, when the radiation image read-out apparatus is of a point scan system in which the stimulable phosphor sheet is exposed to the stimulating light beam from pixel to pixel, the read-out time cannot be sufficiently shortened due to the response time of the stimulable phosphor sheet.

SUMMARY OF THE INVENTION

In view of the foregoing observations and the description, the primary object of the present invention is to provide a radiation image read-out apparatus which can be small in size.

Another object of the present invention is to provide a radiation image read-out apparatus which can read out a radiation image at a high speed.

In accordance with the present invention, there is provided a radiation image read-out apparatus in which a stimulable phosphor sheet storing thereon a radiation image is exposed to stimulating light and stimulated emission emitted from the stimulable phosphor sheet upon stimulation by the stimulating light is detected and an image signal representing the radiation image stored on the stimulable phosphor sheet is obtained by photoelectrically converting the stimulated emission, the radiation image read-out apparatus characterized by having a read-out system comprising an array of a plurality of read-out heads, each comprising a stimulating light source which projects the stimulating light onto the stimulable phosphor sheet and a photodetector which detects the stimulated emission, and a conveyor system which conveys the stimulable phosphor sheet and the read-out system relative to each other in a direction intersecting the direction of the array of the read-out heads.

The conveyor system may move one of the stimulable phosphor sheet and the read-out system or both of them, though it is preferred from the viewpoint of reducing the overall size of the radiation image read-out apparatus that the conveyor system moves the read-out system with the stimulable phosphor sheet kept stationary.

In the read-out system, the read-out heads may be arranged either linearly or two-dimensionally. That the read-out heads are linearly arranged means that the read-out heads are arranged in a row so that the read-out scanning lines of the respective read-out heads (the lines along which the stimulating light beams are caused to scan the stimulable phosphor sheet in the respective read-out heads) are substantially aligned with each other on the stimulable phosphor sheet, and that the read-out heads are two-dimensionally arranged means that the read-out heads are arranged in a plurality of rows so that the read-out scanning lines of the respective read-out heads form a plurality of substantially parallel lines on the stimulable phosphor sheet. In the latter case, the read-out heads may be arranged so that the read-out scanning lines of the respective read-out heads are arranged in a zigzag pattern on the stimulable phosphor sheet.

The "direction of the array of the read-out heads" means the direction in which the row or the rows of the read-out heads extends, and "a direction intersecting the direction of the array of the read-out heads" means any direction which intersects the direction of the array of the read-out heads without limited to the direction normal to the direction of the array of the read-out heads.

The read-out system may include at least two read-out heads so long as the sum of the read-out widths (the width over which the read-out head reads out an image signal) of the read-out heads is substantially equal to the necessary overall read-out width (generally about 350 mm or 430 mm). It is preferred that the read-out width of each read-out head be about ½ to ¹⁄₁₀ of the necessary overall read-out width.

It is preferred that the read-out heads simultaneously read out image signals, though it is not necessary and the read-out heads may read out image signals in sequence.

It is preferred that the stimulating light source of each read-out head comprises a semiconductor laser and an optical deflector. As the optical deflector, various deflectors including a miniaturized polygonal mirror, a micro scanner, an acousto-optic deflector, and an electro-optic deflector and the like may be employed. Especially, the acousto-optic deflector and the electro-optic deflector are preferable when a plurality of read-out heads simultaneously read out image signals since they are easy to control the deflecting direction. In this case, it is possible to cause the read-out heads to read out image signal in synchronization with each other by controlling the optical deflectors of the respective read-out heads so that the deflecting directions of the respective optical deflectors become substantially equal to each other.

It is preferred that the photodetector comprises a photoelectric convertor element and a stimulating light cut filter which cuts light of a wavelength near the wavelength of the stimulating light.

Further, it is preferred that the read-out system be provided with an erasing light source for erasing a radiation image stored on the stimulable phosphor sheet.

Further, it is preferred that the read-out system be provided with a read-out noise suppressing means which suppresses image read-out noise due to optical crosstalk between adjacent read-out heads.

The read-out noise suppressing means may comprise, for instance, a light-shielding member which optically prevents optical crosstalk between adjacent read-out heads, or a correction means which corrects an image signal to compensate for influence of the optical crosstalk on the image signal, or a read-out control means which controls the read-out heads so that adjacent read-out heads do not simultaneously read image signals.

Further, it is preferred that the read-out system be provided with a spacer member which keeps constant the distance between the read-out heads and the stimulable phosphor sheet. It is especially preferred that the spacer member is in the form of a revolvable roller.

Since being provided with a read-out system comprising an array of a plurality of read-out heads, each comprising a stimulating light source which projects the stimulating light onto the stimulable phosphor sheet and a photodetector which detects the stimulated emission, the radiation image read-out apparatus in accordance with the present invention may be smaller in the scanning distance than the conventional radiation image read-out apparatus which is provided with a single stimulating light source. Accordingly, in accordance with the present invention, the read-out system can be small in size, which makes it feasible to reduce the overall size of the radiation image read-out apparatus.

Further, when the conveyor system moves the read-out system with the stimulable phosphor sheet kept stationary, the necessary space can be smaller as compared with when the stimulable phosphor sheet is moved. Further, since the scanning optical system of each read-out head is smaller than the scanning optical system in the conventional radiation image read-out apparatus, the conveyor system need not be so firm and can be manufactured at low cost.

Further, since having a plurality of read-out heads which can be simultaneously operated, the radiation image read-out apparatus in accordance with the present invention can read an image at a higher speed than the conventional radiation image read-out apparatus of a point scan system.

BRIEF DESCRIPTION OF THE DRAWINGS

FIG. 1 is a schematic perspective view of a radiation image read-out apparatus in accordance with an embodiment of the present invention, FIGS. 3A and 3B are plan views showing the stimulating light source section and the photodetector section in the read-out head, FIG. 6 is a perspective view of a modification of the read-out system.

DESCRIPTION OF THE PREFERRED EMBODIMENT

In FIG. 1, a radiation image read-out apparatus in accordance with an embodiment of the present invention comprises a read-out system 20 which reads a radiation image stored on the stimulable phosphor sheet 10, a conveyor system (not shown) which conveys the read-out system 20 relative to the stimulable phosphor sheet 10 in the direction of arrow Y, and an image processing system (not shown) connected to the read-out system 20.

Figure 2:
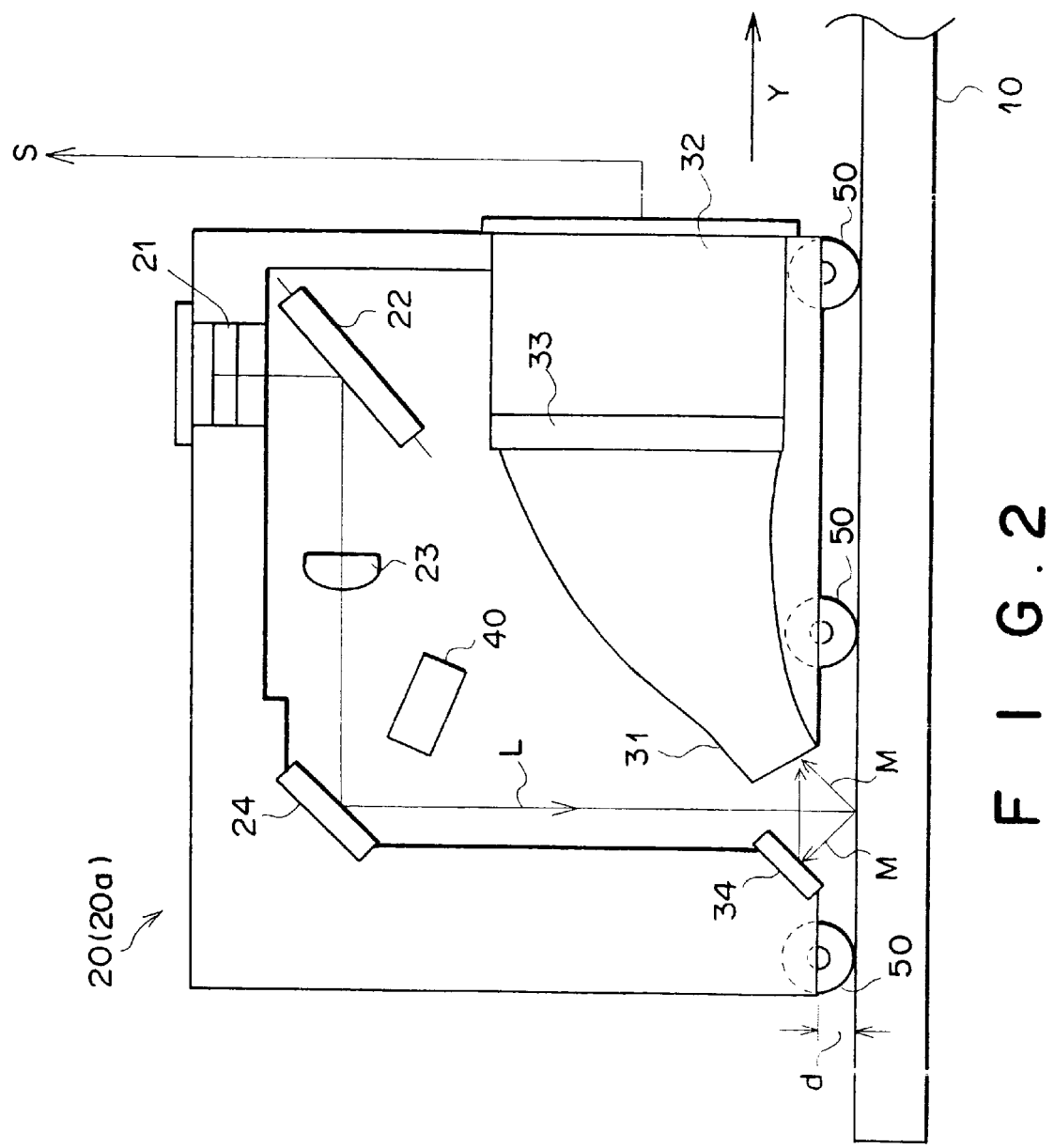
FIG. 2 is a cross-sectional view of the read-out head employed in the radiation image read-out apparatus.

The read-out system 20 comprises a plurality of read-out heads 20a to 20f, which are arranged in the transverse direction of the stimulable phosphor sheet 10 (the direction of arrow X) and integrated into an array and is opposed to the surface of the stimulable phosphor sheet 10. As shown in FIG. 2, each of the read-out heads 20a to 20f comprises a stimulating light source section, a photodetector section and an erasing light source section 40. The stimulating light source section comprises a semiconductor laser 21 which emits stimulating light beam L, an optical deflector (a micro optical scanner) 22 which reflects the stimulating light beam L to cause it to scan the stimulable phosphor sheet 10 in the direction of arrow X (the main scanning), an fθ lens 23 which causes the stimulating light beam L reflected by the optical deflector 22 to converge on the stimulable phosphor sheet 10 and to scan the stimulable phosphor sheet 10 at a constant speed, and a mirror 24 which reflects the stimulating light beam L, passing through the fθ lens 23, toward the stimulable phosphor sheet 10. The photodetector section comprises a light guide 31 which comprises optical fibers for collecting stimulated emission M emitted from the stimulable phosphor sheet 10 upon stimulation by the stimulating light beam L, a photomultiplier 32 which amplifies the stimulated emission M collected by the light guide 31 and converts it into an image signal, S, a stimulating light cut filter 33 which is disposed between the light guide 31 and the photomultiplier 32 to prevent the stimulating light beam L from entering the photomultiplier 32, and a condenser mirror 34 which extends in the main scanning direction (the direction of arrow X) and causes the stimulated emission to enter the light guide 31. The erasing light source section 40 emits light which stimulates the stimulable phosphor sheet 10 after read-out of the image to release the residual radiation energy stored thereon. The read-out system 20 is provided with a spacer 50 for keeping constant the distance d between the stimulable phosphor sheet 10 and each of the read-out heads 20a to 20f. The spacer 50 is in the form of a roller so that the read-out section 20 can be easily conveyed. Since the erasing light source section 40 is provided in each read-out head, the erasing section which has been provided outside the read-out section can be eliminated, whereby the overall size of the radiation image read-out apparatus can be reduced.

FIGS. 3A and 3B show the stimulating light source section and the photodetector section in each of the read-out heads 20a to 20f. As shown in FIG. 3A, the stimulating light beam L emitted from the semiconductor laser 21 is converged on the stimulable phosphor sheet 10 and is caused to scan the stimulable phosphor sheet 10 at a constant speed along a scanning line 25 by the fθ lens 23. Further, as shown in FIG. 3B, the light guide 31 has a light inlet end face which extends along the scanning line 25 near thereto.

In this particular embodiment, the read-out system 20 is provided with six read-out heads 20a to 20f, and the read-out width (scanning width) of each read-out head is about ⅙ of the width of the stimulable phosphor sheet 10. The number of the read-out heads need not be limited to six so long as the read-out system 20 is provided with at least two read-out heads. It is preferred that the number of the read-out heads be two to ten and the read-out width of each read-out head be ½ to 1/10.

Operation of the radiation image read-out apparatus of this embodiment will be described, hereinbelow.

The read-out heads 20a to 20f are controlled to operate in synchronization with each other and to respectively read images in areas A to F (FIG. 1) on the stimulable phosphor sheet 10.

In each of the read-out heads 20a to 20f of the read-out system 20, a stimulating light beam L at a predetermined wavelength is emitted from the semiconductor laser 21 and the stimulating light beam L is deflected in a predetermined direction by the deflector 22. The deflected stimulating light beam L is converged on the surface of the stimulable phosphor sheet 10 through the gap between the light guide 31 and the condenser mirror 34 and is caused to scan the surface of the stimulable phosphor sheet 10 in the main scanning direction X at a constant speed by the fθ lens 23 and the mirror 24. In this case, it is possible to cause the read-out heads 20a to 20f to read out image signal in synchronization with each other by controlling the optical deflectors 22 of the respective read-out heads 20a to 20f so that the deflecting directions of the respective optical deflectors 22 become substantially equal to each other. The read-out section 20 is moved in the sub-scanning direction Y by the conveyor system (not shown) along with the main scanning by the respective read-out heads 20a to 20f, whereby substantially the entire area of the stimulable phosphor sheet 10 is exposed to the stimulating light beam L.

The part of the stimulable phosphor sheet 10 exposed to the stimulating light beam L emits stimulated emission M in proportion to the amount of radiation image stored thereon. The stimulated emission M diverges in all the directions, and a part of the stimulated emission M directly enters the light guide 31 through the light inlet end face thereof and another part of the stimulated emission M is reflected by the condenser mirror 34 to enter the light guide 31 through the light inlet end face thereof. The stimulated emission M thus introduced into the light guide 31 impinges upon the photomultiplier 32 through the stimulating light cut filter 33. The photomultiplier 32 amplifies the stimulated emission M and converts it into an electric image signal S. The electric image signal S is input into an external signal processing system. While the read-out system 20 is returned to the original position, the erasing light source 40 is driven to cause the stimulable phosphor sheet 10 to release the residual radiation energy, whereby the stimulable phosphor sheet 10 is restored to be usable again.

Figure 4:
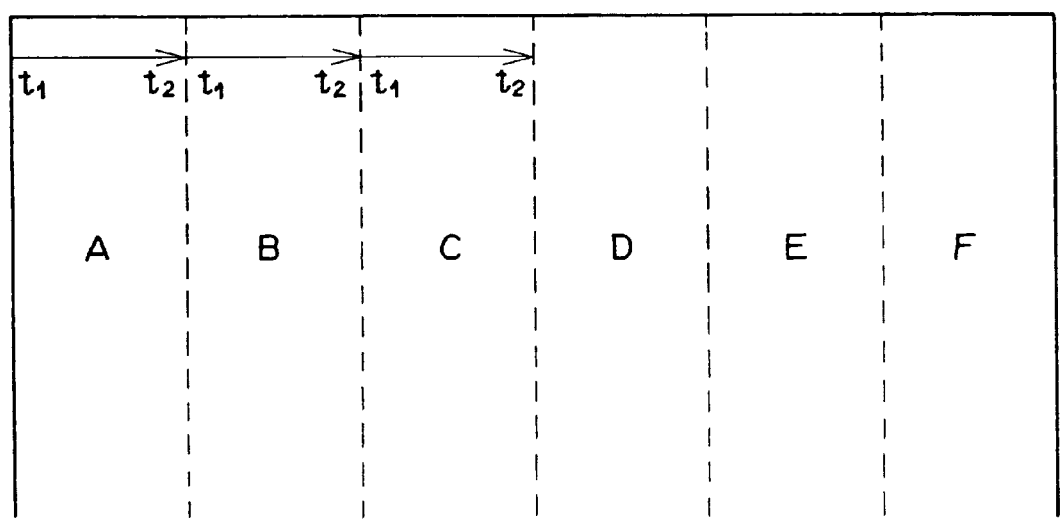
FIG. 4 is a view for illustrating image read-out in the radiation image read-out apparatus.

Since the read-out heads 20a to 20f read images in synchronization with each other, the image reading time can be shortened. That is, the readout heads 20a to 20f are controlled so that the scanning positions of the respective stimulating light beams L are at the left end of each areas A to F at time t1 and are at the right end of the each areas A to F at time t2 as shown in FIG. 4.

Figure 5A:
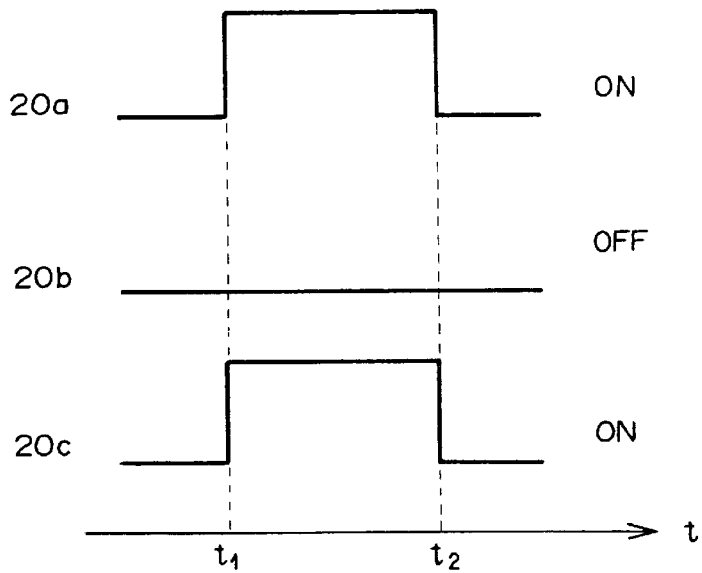
FIGS. 5A and 5B are views for illustrating the operation of the read-out heads for obtaining the optical crosstalk component.
Figure 5B:
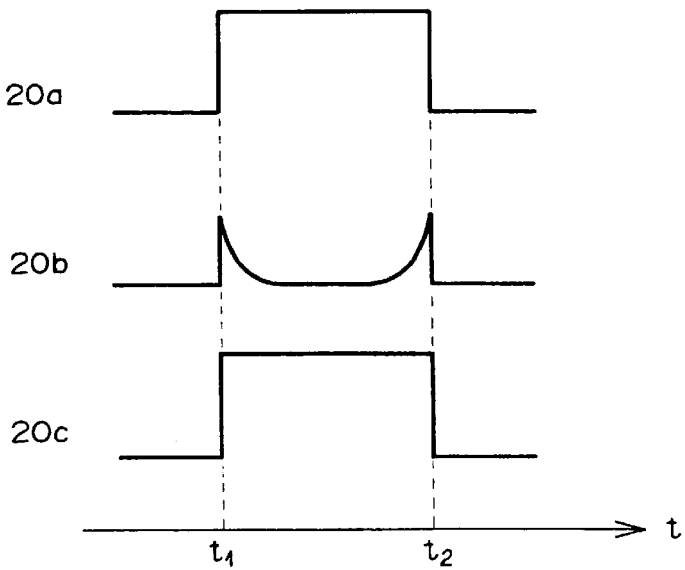

When the read-out heads 20a to 20f are thus operated in synchronization with each other, optical crosstalk can occur between adjacent read-out heads. Such optical crosstalk makes noise in the image signal and accordingly should be compensated for. In order to remove or suppress the noise, in this particular embodiment, the crosstalk component is obtained in advance prior to read-out, and then the crosstalk component is subtracted from the obtained image signal. For example, the crosstalk component for the area B is obtained in the following manner. That is, when read-out operation is carried out on a stimulable phosphor sheet 10, which has been uniformly exposed to radiation, with the stimulating light beam L of the read-out head 20b for the area B kept off and the stimulating light beams L of the adjacent read-out heads 20a and 20c kept on as shown in FIG. 5A, the photodetector section of the read-out head 20b detects the crosstalk component from the adjacent read-out heads 20a and 20c as shown in FIG. 5B. As shown in FIG. 5A, the read-out heads 20a and 20c scan the areas A and C with the stimulating light beams L projected onto the stimulable phosphor sheet 10 from time t1 to time t2 and the read-out head 20b scans the area B with the stimulating light beam L not projected onto the stimulable phosphor sheet 10. The signal detected by the photodetector section of the read-out head 20b during this scanning time solely represents crosstalk between the read-out heads 20a and 20b and between the read-out heads 20b and 20c as can be seen from FIG. 5B. Near the time t1 (scanning start time), the signal detected by the photodetector section of the read-out head 20b is more affected by the stimulating light beam L of the read-out head 20c, and near the time t2 (scanning end time), the signal detected by the photodetector section of the read-out head 20b is more affected by the stimulating light beam L of the read-out head 20a. By obtaining the crosstalk component for each read-out head, the image signal obtained by each read-out head can be removed with the crosstalk component.

Though, in the embodiment described above, the read out system 20 comprises a plurality of read-out heads which are linearly arranged, the read-out system 20 may comprise a plurality of read-out heads which are two-dimensionally arranged as shown in FIG. 6. When the read-out heads are two-dimensionally arranged, an increased number of areas can be read at one time, whereby the read-out time can be more shortened. At the same time, the distance by which the read-out head is to be conveyed can be shortened.

Figure 7:
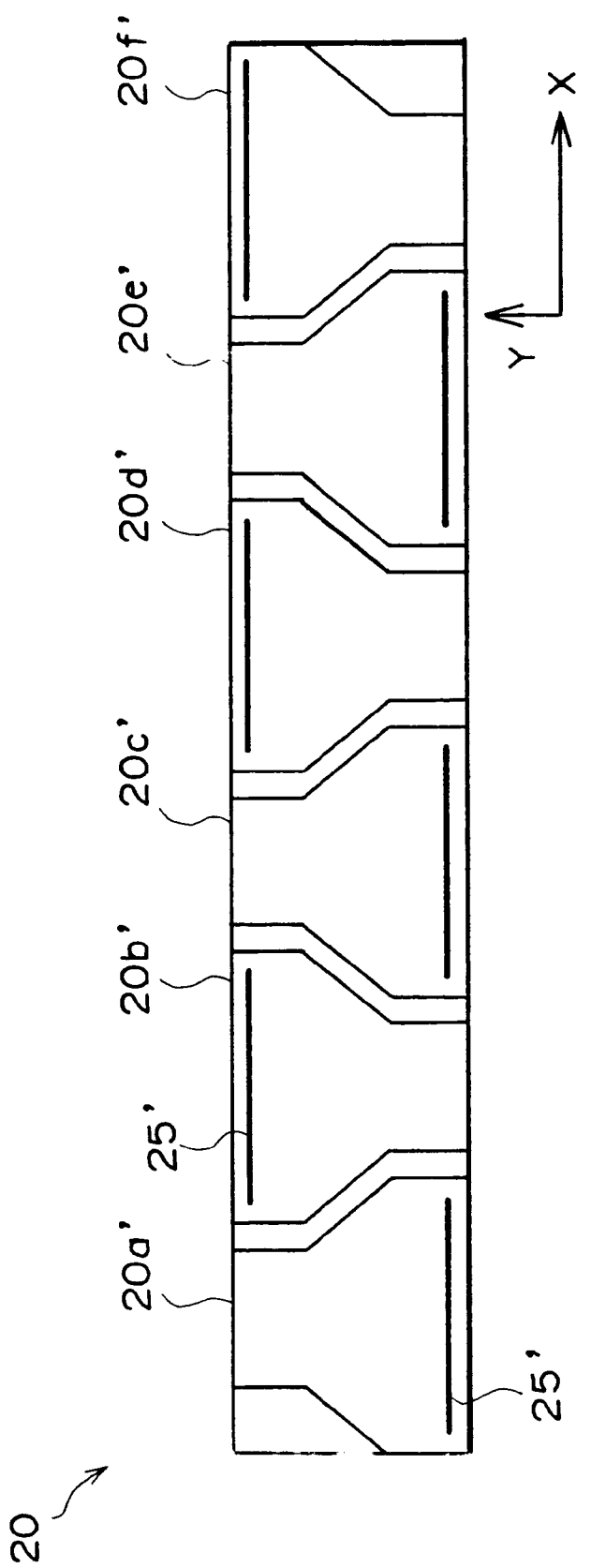
FIG. 7 is a plan view of another modification of the read-out system.

As shown in FIG. 7, the read-out heads (20a' to 20f') may be arranged so that the read-out scanning lines 25' of the respective read-out heads 20a' to 20f' are arranged in a zigzag pattern on the stimulable phosphor sheet 10. In FIG. 7, each of the read-out heads 20a' to 20f' is flared toward the photodetector section, and the read-out heads 20a' to 20f' are arranged to alternately directed in opposite directions so that the read-out scanning lines 25' of the respective read-out heads 20a' to 20f' are arranged in a zigzag pattern on the stimulable phosphor sheet 10. In this case, though the scanning lines 25' of adjacent two read-out heads are staggered in the sub-scanning direction Y, it can be compensated for by the signal processing system. When the read-out scanning lines 25' are arranged in this manner, it is not necessary for each read-out head to read the image up to the extreme edge of the read-out head, and at the same time, crosstalk between adjacent read-out heads can be prevented.

Figure 8:
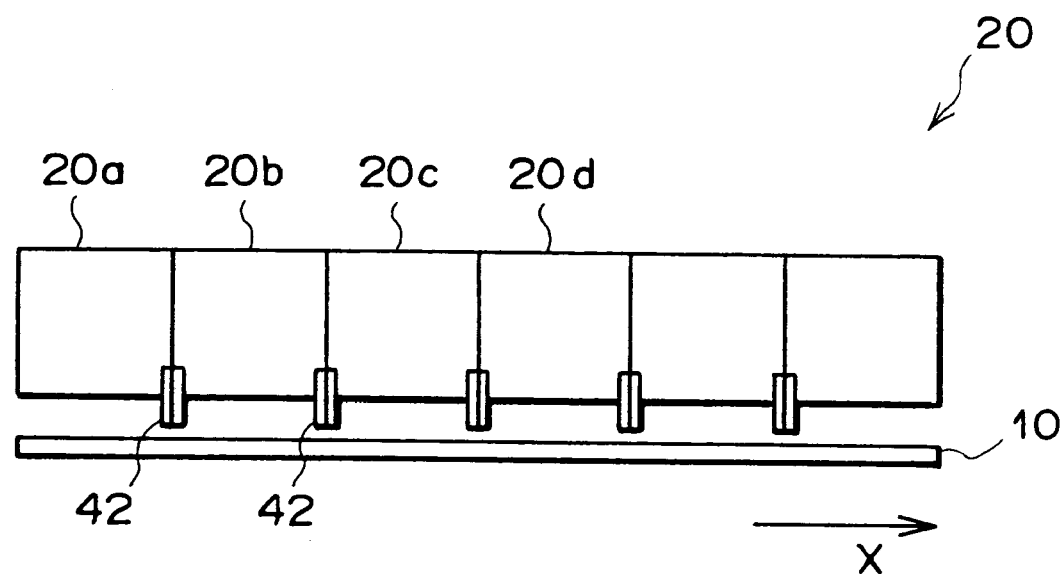
FIG. 8 is a view showing another modification of the read-out system.

The aforesaid crosstalk between adjacent read-out heads may be prevented by interposing a light-shielding member 42 between adjacent read-out heads as shown in FIG. 8 so that the stimulated emission M emitted from each area cannot enter the photodetector section of the adjacent read-out head. Disposition of the light-shielding member 42 may be effected together with the aforesaid crosstalk correction.

Crosstalk between adjacent read-out heads can be prevented by controlling the read-out heads so that adjacent read-out heads do not simultaneously read images. For example, when the read-out heads 20a to 20f in FIG. 1 are controlled so that every other read-out heads 20a, 20c and 20e first read images and the other read-out heads 20b, 20d and 20f next read images, adjacent read-out heads do not operate at one time, whereby crosstalk between adjacent read-out heads can be prevented.

In addition, all of the contents of Japanese Patent Application No. 2000-012353 are incorporated into this specification by reference.

What is claimed is:

1. A radiation image read-out apparatus in which (1) a stimulable phosphor sheet storing thereon a radiation image is exposed to stimulating light, (2) stimulated emission emitted from the stimulable phosphor sheet upon stimulation by the stimulating light is detected, and (3) an image signal representing the radiation image stored on the stimulable phosphor sheet is obtained by photoelectrically converting the stimulated emission, the radiation image read-out apparatus comprising:

a read-out system with a plurality of read-out heads arranged in an array that extends in a first direction, each read-out head having (1) a stimulating light source which projects the stimulating light onto the stimulable phosphor sheet, and (2) a photodetector which detects the stimulated emission, wherein the stimulating light source moves the stimulating light relative to the photodetector along a scanning line that extends in the first direction; and a conveyor system which conveys the stimulable phosphor sheet and the read-out system relative to each other in a second direction intersecting the first direction.

2. The radiation image read-out apparatus as defined in claim 1, wherein the conveyor system moves the read-out system with the stimulable phosphor sheet kept stationary.

3. The radiation image read-out apparatus as defined in claim 1, wherein the read-out heads are linearly arranged.

4. The radiation image read-out apparatus as defined in claim 1, wherein the read-out heads are two-dimensionally arranged.

5. The radiation image read-out apparatus as defined in claim 1, wherein the read-out heads are arranged in a zigzag pattern in the first direction.

6. The radiation image read-out apparatus as defined in claim 1, wherein the read-out heads simultaneously read out image signals from different areas.

7. The radiation image read-out apparatus as defined in claim 1, wherein the stimulating light source of each read-out head comprises a semiconductor laser and an optical deflector.

8. The radiation image read-out apparatus as defined in claim 1, wherein the photodetector of each read-out head comprises a photoelectric convertor element and a stimulating light cut filter which cuts light of a wavelength near the wavelength of the stimulating light.

9. The radiation image read-out apparatus as defined in claim 1, wherein the read-out system is provided with an erasing light source for erasing a radiation image stored on the stimulable phosphor sheet.

10. The radiation image read-out apparatus as defined in claim 1, wherein the read-out system is provided with a read-out noise suppressing mechanism which suppresses image read-out noise due to optical crosstalk between adjacent read-out heads.

11. The radiation image read-out apparatus as defined in claim 10, wherein the read-out noise suppressing mechanism comprises a light-shielding member disposed between adjacent read-out heads to optically prevent optical crosstalk between the adjacent read-out heads.

12. The radiation image read-out apparatus as defined in claim 10, wherein the read-out noise suppressing mechanism comprises a correction means for correcting an image signal to compensate for influence of the optical crosstalk on the image signal.

13. The radiation image read-out apparatus as defined in claim 10, wherein the read-out noise suppressing mechanism comprises a read-out control means for controlling the read-out heads so that adjacent read-out heads do not simultaneously read image signals.

14. The radiation image read-out apparatus as defined in claim 1, wherein the read-out system includes a spacer member which maintains a constant distance between the read-out heads and the stimulable phosphor sheet.

15. The radiation image read-out apparatus as defined in claim 14, wherein the spacer member is a revolvable roller.

16. A radiation image read-out apparatus comprising:

a plurality of read-out heads arranged in an array that extends in a first direction, each read-out head having (1) a scanning line stimulating light source for scanning the stimulating light across a stimulable phosphor sheet along a scanning line, and (2) a photodetector for detecting a stimulated emission from the stimulable phosphor sheet; and a conveyor system for conveying the stimulable phosphor sheet and the read-out heads relative to each other in a second direction intersecting the first direction.

17. The radiation image read-out apparatus as defined in claim 16, wherein the scanning line stimulating light source of each read-out head moves the stimulating light relative to the photodetector.

18. The radiation image read-out apparatus as defined in claim 16, wherein the scanning line of each read-out head is parallel to the first direction.

19. The radiation image read-out apparatus as defined in claim 16, wherein the stimulating light source of each read-out head comprises a semiconductor laser and an optical deflector.

20. A radiation image read-out apparatus in which (1) a stimulable phosphor sheet storing thereon a radiation image is exposed to stimulating light, (2) stimulated emission emitted from the stimulable phosphor sheet upon stimulation by the stimulating light is detected, and (3) an image signal representing the radiation image stored on the stimulable phosphor sheet is obtained by photoelectrically converting the stimulated emission, the radiation image read-out apparatus comprising:

a read-out system with a plurality of read-out heads arranged in an array that extends in a first direction, each read-out head having (1) a stimulating light source which projects the stimulating light onto the stimulable phosphor sheet, and (2) a photodetector which detects the stimulated emission, wherein the stimulating light source moves the stimulating light relative to the photodetector along a scanning line that extends in the first direction, and wherein the plurality of readout heads are arranged to cover an entire width of the stimulable phosphor sheet in a predetermined direction; and a conveyor system which conveys the stimulable phosphor sheet and the read-out system relative to each other in a second direction intersecting the first direction.

* * * * *